United States Patent Office 2,806,048
Patented Sept. 10, 1957

2,806,048
6,8-DIHYDROXYOCTANOIC ACID AND RELATED COMPOUNDS

William H. Jones, Metuchen, N. J., assignor to Merck & Co., Inc., Rahway, N. J., a corporation of New Jersey No Drawing. Application July 27, 1954,
Serial No. 446,165

13 Claims. (Cl. 260—410.9)

This invention relates to a polyhydroxy aliphatic acid and in particular to 6,8-dihydroxyoctanoic acid, and salts thereof, to processes for preparing these compounds and to intermediate compounds thus obtained.

The compounds which are the subject of the present invention are 6,8-dihydroxyoctanoic acid which has the following structural formula:

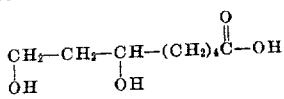

and salts thereof.

These compounds are valuable in the production of other novel chemical compounds, such as synthetic resins of the polyester type and are particularly important as precursors in the synthesis of 5-[3-(1,2-dithiacyclopentyl)]-pentanoic acid (α-lipoic acid).

The 6,8-dihydroxyoctanoic acid is prepared by reacting a δ-carbo-R-oxyvaleraldehyde with acetaldehyde to form the corresponding aldol condensation product which is treated with a reducing agent to form an ester of 6,8-dihydroxyoctanoic acid. This ester may then be saponified to form 6,8-dihydroxyoctanoic acid, thereby forming the salt of the acid as an intermediate. These reactions may be chemically represented as follows:

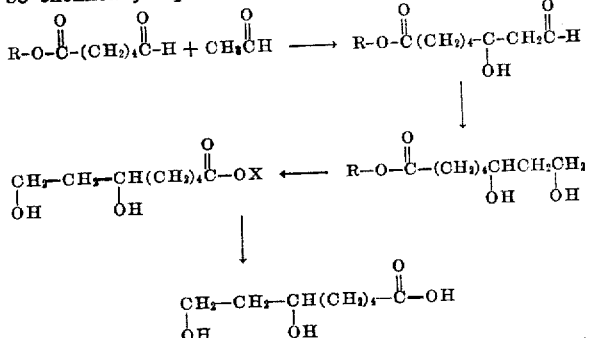

wherein X is a metal and R is an alkyl, aryl or aralkyl radical having from 1 to 12 carbon atoms.

The reaction of δ-carbo-R-oxyvaleraldehyde with acetaldehyde to form the aldol condensation product is carried out in the presence of any of the common aldol condensation catalysts. Typical examples of such catalysts are alkali and alkaline earth metal hydroxides, cyanides and carbonates, alkali metal sulfites, normal alkali metal phosphates and organic bases, such as benzyltrimethylammonium hydroxide, piperidine and triethylamine. The reaction is preferably carried out in a solvent, such as water, a lower alcohol, an ether, a hydrocarbon, or a mixture of water and organic solvent. Particular solvents which may be mentioned are water, methanol, ethanol, propanol, ethyl ether, methyl ethyl ether, dioxane, toluene, benzene, hexane and chloroform. The time of the reaction will vary depending upon the particular conditions used and the catalyst. The temperature of the reaction is preferably below 20° C. because above this temperature care must be exercised to prevent spontaneous dehydration of the aldol. At a temperature of approximately —5° C. the reaction requires about 2 to 5 hours for completion when sodium hydroxide is the catalyst. It is preferred to use δ-carbethoxyvaleraldehyde as the starting material to form 6,8-dihydroxyoctanoic acid although other alkoxy, aryloxy or aralkoxy derivatives may be used, such as δ-carbomethoxyvaleraldehyde, δ-carbopropionoxyvaleraldehyde, δ-carbobenzoxyvaleraldehyde, or the like.

The aldol condensation product is reacted with a reducing agent to form the corresponding ester of 6,8-dihydroxyoctanoic acid. This reaction is preferably carried out without purifying the condensation product to prevent dehydration with reduction in yield. The reducing agent may be any of the common reducing agents, such as the alkali metal borohydrides, aluminum and magnesium alcoholates, metal-acid combinations, for example, zinc or tin with hydrochloric acid, or amalgam-acid combinations, such as zinc amalgam. This reduction may also be carried out by hydrogenation of the aldol condensation product in the presence of a hydrogenation catalyst. Any of the common hydrogenation catalysts may be used, such as Raney nickel, platinum or palladium or such catalyst supported on carriers, such as barium sulfate, calcium carbonate or barium carbonate. The reduction is preferably carried out directly on the aldol condensation mixture or in a solvent, such as water, a lower alcohol, an ether, hydrocarbon or the like. The reduction is preferably carried out at a temperature of less than 20° C. The time required for the reduction is dependent on the reducing agent, catalyst and the other conditions, but is usually completed within a few minutes to several hours. The ester may be recovered from the reaction mixture by separating the organic solvent phase containing the product from the rest of the mixture and then concentrating the solution to dryness.

The ester may be converted to the acid by saponification. This may be readily accomplished by reacting the ester with a base to form the salt of the acid, such as alkali metal, and alkaline earth metal salts followed by acidification of the salt thus formed. Inorganic bases, such as alkali metal hydroxides and carbonates, and particularly sodium hydroxide, potassium hydroxide and sodium carbonate are useful for effecting this conversion. The reaction is conveniently effected by contacting the ester with a suitable base in the presence of water. Polar solvents such as the lower alcohols like methanol and ethanol mixed with water are particularly suitable reaction media. The reaction proceeds at ordinary temperatures although slightly elevated temperatures may be used if desired. The reaction requires from about ½ to 8 hours for completion. The 6,8-dihydroxyoctanoic acid may be separated from the reaction medium by acidifying the salt of the acid, and then extracting with a water immiscible solvent. The organic extract may then be concentrated to dryness to recover the product. This product may further be purified, if desired, by separating from the contaminants by chromatography on an anion exchange resin. The type of anion exchange resin can be varied and any of the common ones such as Amberlite IRA-400, Amberlite XE-98 (manufactured by Rohm & Haas Co.) or Dowex-1 (manufactured by Dow Chemical Company) may be employed. These resins are of the type described in U. S. Patents 2,597,494; 2,597,440; 2,570,822; 2,567,836 and 2,543,666.

Other conventional methods of purification such as partition chromatography, concurrent distribution, fractional precipitation or recrystallization may also be used. As an example, concurrent distribution utilizing the system methanol-water-benzene-ethyl-acetate is effective for recovering the product.

The following examples are given for purposes of illustration:

Example 1

Two hundred milliliters of 2 N sodium hydroxide is cooled to —5° C. in an ice-salt bath. A mixture of 31.6 g. (0.2 mole) of δ-carbethoxyvaleraldehyde and 44.1 g. (1.0 mole) of freshly distilled acetaldehyde in 150 ml. of ice-cold ether is then added dropwise to the cooled sodium hydroxide with vigorous stirring during a period of approximately two hours, while keeping the temperature below —5° C. The reaction mixture is stirred at —10° to —5° C. for one hour after the addition is complete. The product is 3-hydroxy-7-carbethoxy-enanthaldehyde.

Example 2

The aldol condensation product formed in Example 1 is mixed at 0° C. with small portions of solid sodium borohydride in excess (approximately 20 g.). There is an instantaneous heat rise after each addition, and completion of the reduction is indicated by the absence of heat rise after further addition of the reducing agent and by the evolution of hydrogen upon the addition of a drop of concentrated hydrochloric acid. The ether layer, containing the desired product, is then separated and the aqueous alkaline layer is extracted with two 100 ml. portions of ether. The combined ether solution is washed successively with 100 ml. each of dilute acetic acid, water, dilute sodium bicarbonate solution and finally water. The ether layer is dried over anhydrous sodium sulfate. After removal of the drying agent by filtration, the ether solution is concentrated to dryness under reduced pressure. The residue remaining after distillation of the ether is an oil comprising the ethyl ester of 6,8-dihydroxyoctanoic acid.

Example 3

The product obtained in Example 2 is heated for two hours with 100 ml. of 1.0 N sodium hydroxide to form the sodium salt. The mixture is then diluted with 200 ml. of water, cooled in ice, and acidified with concentrated hydrochloric acid, thereby forming 6,8-dihydroxyoctanoic acid. The acidic solution is then extracted with four 50 ml. portions of ether. The combined ether extracts are washed with 100 ml. of water and then extracted with three 30 ml. portions of dilute sodium bicarbonate solution. The combined sodium bicarbonate extracts are cooled in ice and acidified with 6 N hydrochloric acid. The acidic solution is then extracted with three 50 ml. portions of ether. The combined ether extracts are concentrated to dryness under reduced pressure and the residue is dissolved in a minimum amount of 0.1 N sodium hydroxide. The 6,8-dihydroxyoctanoic acid is separated from contaminants by chromatography on an anion exchange resin. The aqueous alkaline solution is passed through a column containing Amberlite IRA–400, an anion exchange resin, which had previously been placed on the hydroxyl cycle. The column is washed with water and the product is fractionally eluted with dilute acetic acid. The 6,8-dihydroxyoctanoic acid is obtained by concentrating the acetic acid eluates to dryness under reduced pressure.

The 6,8-dihydroxyoctanoic acid, as previously stated, is particularly useful as a precursor in the synthesis of α-lipoic acid. The dihydroxyoctanoic acid is readily converted to dihydrolipoic acid by treating with hydrogen sulfide or other similar reagents, such as thiourea and hydrobromic acid. This compound may then be converted to α-lipoic acid by oxidation with iodine or other suitable oxidizing agents.

This conversion may be illustrated by the following example:

Example 4

A 10.0 g. sample of 6,8-dihydroxyoctanoic acid, formed as in Example 3, is refluxed with 20 g. of thiourea in 100 ml. of 40% hydrobromic acid for eight hours. The reaction mixture, containing 6,8-di[2-(2-thiopseudoureido)] octanoic acid dihydrobromide, is made alkaline by the addition of sodium hydroxide and then the mixture is refluxed to form the trisodium salt of 6,8-dithioloctanoic acid. The mixture is acidified with hydrochloric acid to form 6,8-dithioloctanoic acid which is extracted with chloroform. The chloroform solution is treated with a solution of iodine and potassium iodide. The excess iodine is removed by washing the chloroform layer with a dilute aqueous solution of sodium bisulfite. The chloroform layer is dried and concentrated to yield a residue of crude DL-α-lipoic acid. The crude product is extracted with warm cyclohexane from which essentially pure crystalline DL-α-lipoic acid crystallizes on being cooled.

Any departure from the above description which conforms to the present invention is intended to be included within the scope of the claims.

What is claimed is:

1. A compound having the formula—

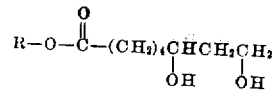

wherein R is selected from the group consisting of hydrogen, alkyl, aryl or aralkyl groups containing from one to twelve carbon atoms, and metals.

2. A compound having the formula—

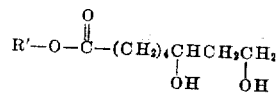

wherein R' is a hydrocarbon group containing from one to twelve carbon atoms.

3. 6,8-dihydroxyoctanoic acid.
4. A metal salt of 6,8-dihydroxyoctanoic acid.
5. Sodium salt of 6,8-dihydroxyoctanoic acid.
6. A lower alkyl ester of 6,8-dihydroxyoctanoic acid.
7. Ethyl ester of 6,8-dihydroxyoctanoic acid.
8. 3-hydroxy-7-carbethoxy-enanthaldehyde.
9. A process which comprises reacting δ-carboalkoxyvaleraldehyde with acetaldehyde to form the corresponding aldol condensation product, treating the condensation product with a reducing agent to form the corresponding alkyl ester of 6,8-dihydroxyoctanoic acid, reacting the alkyl ester with a base to form an acid salt of 6,8-dihydroxyoctanoic acid and then acidifying the salt to form 6,8-dihydroxyoctanoic acid.
10. The process which comprises reacting δ-carbethoxyvaleraldehyde with acetaldehyde to form the corresponding aldol condensation product, treating the condensation product with a reducing agent to form the ethyl ester of 6,8-dihydroxyoctanoic acid.
11. A process which comprises reacting δ-carbethoxyvaleraldehyde with acetaldehyde in the presence of an aldol condensation catalyst to form 3-hydroxy-7-carbethoxy-enanthaldehyde.
12. The process of claim 15 wherein the catalyst is sodium hydroxide.
13. A process which comprises reacting 3-hydroxy-7-carbethoxy-enanthaldehyde with alkali metal borohydride to form the ethyl ester of 6,8-dihydroxyoctanoic acid.

References Cited in the file of this patent

Breusch et al.: "Rev. faculte sci. univ. Istanbul" 16a, 137–43 (1951), cited in Chem. Abstracts 47, 6867e.

Richter: "Organic Chemistry," copyright 1952, pages 103 and 114.

Bullock et al.: J. Am. Chem. Soc., vol. 74, page 3455 (July 5, 1952).

Brockman, Jr., et al.: J. Am. Chem. Soc., vol. 74, page 1868 (April 1952).

Bullock et al.: J. Am. Chem. Soc., vol. 74, pages 1868–69 (April 1952).

UNITED STATES PATENT OFFICE

CERTIFICATE OF CORRECTION

Patent No. 2,806,048 September 10, 1957

William H. Jones

It is hereby certified that error appears in the printed specification of the above numbered patent requiring correction and that the said Letters Patent should read as corrected below.

Column 4, line 59, claim 12, the claim reference numeral "15" should read -- 11 --.

Signed and sealed this 5th day of November 1957.

(SEAL)
Attest:
KARL H. AXLINE
Attesting Officer

ROBERT C. WATSON
Commissioner of Patents